United States Patent Office 3,441,500
Patented Apr. 29, 1969

3,441,500
PROCESS FOR ACTIVATING A FIXED BED OF HYDROREFINING CATALYST
Donald K. Wunderlich, Riverdale, Ill., assignor to Sinclair Research, Inc., New York, N.Y., a corporation of Delaware
No Drawing. Filed Aug. 4, 1966, Ser. No. 570,151
Int. Cl. C10g 23/02
U.S. Cl. 208—213         9 Claims

ABSTRACT OF THE DISCLOSURE

A fixed bed of hydrorefining catalyst is activated and simultaneously pre-wet, and the reactor placed onstream, by employing the following serial steps: (1) charging the reactor with solid hydrogenation catalyst; (2) charging the reactor with a normally liquid hydrocarbon, e.g., one having a boiling point above that of gasoline; (3) establishing an internal reactor temperature of about 250 to 500° F., preferably about 300 to 400° F.; (4) passing hydrogen sulfide gas through the reactor, preferably in an upflow direction, for about 3 to 12 hours at a pressure of about atmospheric to 500 p.s.i.g., while maintaining the hydrocarbon in liquid phase; (5) discontinuing hydrogen sulfide flow and removing the liquid hydrocarbon from the catalyst bed; (6) pressuring the reactor to the desired hydrorefining level with hydrogen; and (7) cutting in fresh hydrocarbon feed and hydrogen to establish hydrorefining conditions.

---

This invention relates to a method for activating fixed bed hydrogenation catalysts. More particularly, it relates to a novel procedure for sulfiding and pre-wetting a hydrogenation catalyst to be used in the hydrorefining of mineral oil hydrocarbons.

Various methods have been devised and reported for the activation of fixed bed hydrogenation catalysts. Most often these activation steps are designed to serve two purposes: (1) to convert the metals of the catalyst to their sulfide forms and (2) to pre-wet the catalyst with the feed to be refined.

Sulfiding of hydrorefining catalysts immediately prior to employing them in the upgrading, through hydrogenation, of hydrocarbon stocks has become a widely accepted technique of converting the catalysts to what is generally considered their most active state for enhancing hydrogenation. Activation with respect to hydrogenation activity by sulfiding is especially attractive when it is considered that sulfiding of the catalyst generally has a contrary deactivating effect as regards the cracking and coke formation activities of the catalyst. The latter effect is especially important as coking tends to block the metal sites of the catalyst, degrading all forms of catalytic activity thereof.

Pre-wetting of the catalyst bed serves to prevent channeling thereof during the hydrorefining operation. Since channeling is more pronounced when the feed is hydrogenated in the liquid, rather than vapor, continuous phase, the pre-wetting technique is most often confined to fixed catalyst beds employed in liquid continuous phase operations.

Generally, the activation procedures heretofore used involve several lengthy steps which are conducted at high temperatures and pressures. Temperatures ranging upwards of 500° F. and pressures of about 100 to 200 p.s.i.g. are most often employed. Activation at such high temperatures has the disadvantage, however, of destroying a considerable number of the catalytic sites, and, in addition, the requirement of high pressures is economically inexpedient. Still another disadvantage of prior activation techniques is the inability to effect activation of the catalyst and pre-wetting of the catalyst bed simultaneously.

By the method of the present invention, a fixed bed hydrogenation catalyst is activated and simultaneously pre-wet by a simple and economical procedure which results in catalyst activity superior to that achieved by standard activating procedures. This dual activation and pre-wetting operation comprises the following serial steps: (1) charging the reactor with solid hydrogenation catalyst; (2) charging the reactor with a normally liquid hydrocarbon, e.g., boiling above the gasoline range, at such conditions that the catalyst and hydrocarbon, after filling, are at a temperature in the range from about 250 to 500° F.; (3) passing hydrogen sulfide gas at atmospheric pressure (or somewhat higher) through the hydrocarbon while maintaining temperature (the sulfiding reaction is exothermic), for example, by circulating the liquid through a cooler and back to the catalyst bed—this step to be continued for about 3 to 12 hours; (4) discontinuing $H_2S$ flow and removing the liquid hydrocarbon from the catalyst bed; (5) pressuring the reactor to the desired operating level with hydrogen; and (6) cutting in fresh hydrocarbon feed and hydrogen to establish process conditions. The following discussion of the individual steps will more thoroughly explain the process of this invention.

As previously stated, the reactor is a fixed bed reactor and may be of any suitable design. The method of inserting or "charging" catalyst to the reactor is by no means critical; any of the known techniques will suffice. The hydrogenation catalyst is preferably in the solid state and may conveniently be in pelleted or extruded form. In regard to particle size, it is advantageous to use finely divided catalyst, e.g., particles having a diameter of about $\frac{1}{32}''$ to $\frac{3}{8}''$, preferably about $\frac{1}{16}''$ to $\frac{1}{8}''$, and a length of about $\frac{1}{32}''$ to $1''$ or more, preferably about $\frac{1}{16}''$ to $\frac{1}{2}''$. Any suitable hydrogenation catalyst may be used including metals such as nickel, platinum, cobalt, molybdenum, palladium, etc. The catalytically active metal may be in free or combined form, e.g., as oxides, etc., or any combination thereof. Suitable catalyst supports may be used, including inorganic refractory oxides such as silica, alumina, magnesia, thoria, zirconia, titania, etc., either alone or in various combinations. Particularly effective catalyst compositions are those which include an oxide of an element of Group VI–B of the Periodic Table, i.e., chromium, molybdenum or tungsten, in combination with an oxide of a Group VIII iron series metal, i.e., iron, cobalt or nickel. As examples, may be mentioned complexes such as cobalt molybdate, nickel molybdate, nickel tungstate, etc. In general, the catalytic metals comprise a minor amount, e.g., about 0.01 percent to less than about 50 percent by weight, of the total catalyst, the major portion being the support. In the case of the noble metal catalysts, the catalytic element often constitutes about 0.05 to about 2 percent by weight, based on the total catalyst. The above-mentioned catalysts often contain about 0.1 to 15 weight percent of the Group VIII metal and about 0.1 to 20 weight percent of the Group VI–B metal. Conditions affecting the selection of a particular hydrogenation catalyst include the characteristics of the charge stock, the conditions of operation during hydrorefining and the treatment to be effected on the hydrocarbon feed.

The various mineral oil hydrocarbons which may be improved through hydrorefining, for example, by removal of nitrogen, oxygen and sulfur impurities or by hydrogenation of olefinic and aromatic hydrocarbons, can be processed by the method of this invention. Hydrorefining is useful for a wide range of petroleum, coal tar and shale oil fractions for the production of chemical, lubricating oils and fuels. The activation process of this invention is useful for pretreating hydrogenation catalysts prior to upgrading mineral hydrocarbon stocks including base stocks for lubricants, lighter petroleum distillates such as a gas oil for subsequent catalytic cracking and hydrocracking, wax distillates from paraffinic crudes, catalytically cracked distillates, coal tar distillates and like normally liquid hydrocarbons. Such hydrocarbons are also useful in the process as the wetting liquid. This dual catalyst activation and pre-wetting method is especially useful as a pretreatment for catalysts intended to be used in the hydrorefining of hydrocarbon stocks boiling in a higher range than that of gasoline, i.e., having a boiling range primarily greater than about 70 to 90° C.

The sulfiding step of passing $H_2S$ through the fully charged reactor, as stated above, may be conducted at atmospheric or higher pressure for about 3 to 12 hours. Sulfiding time may be reduced by operating at higher $H_2S$ partial pressures, for example up to about 500 pounds per square inch gauge; most often, however, pressures ranging from atmospheric to about 100 p.s.i.g. will be employed. As stated before, the internal temperature of the reactor may be maintained within the approximate range of 250 to 500° F. by circulating the hydrocarbon liquid through a cooling unit such as, for example, the cooler used to lower the temperature of the reactor effluent during normal processing. The hydrogen sulfide is advantageously admitted to the charged reactor in an upflow direction during the pretreatment; feed recirculation may likewise be upflow. Often the temperature during sulfiding will be kept within about 300 to 400° F. and sulfiding times within about 4 to 8 hours. It is noteworthy that prior activation procedures often require considerably longer times, e.g., upwards of 24 hours. Working in the above-defined ranges of temperature, pressure and time, the amount of $H_2S$ transmitted through the charged reactor will often be about 1 to 100 standard cubic feet per pound of catalyst.

Removal of the hydrocarbon from the reactor may, for example in the case where the hydrorefining processing is to be downflow, be effected by draining the reactor, or, where processing is to be upflow, may be accomplished by beginning normal operations, i.e., pumping feedstock and hydrogen into the reactor, thus displacing the pre-wetting liquid. In any case, the method of removing the pretreat liquid hydrocarbon is not critical to the process of this invention and may be effected by methods well known in the art.

The operable pressures for the hydrorefining are conventional and may often range from about 200 to 3500, preferably 500 to 2000, p.s.i.g. Conditions for hydrorefining vary with the particular feed, catalyst and results desired, and are well described in the voluminous literature on petroleum refining. Generally, the feed will be processed at temperatures of about 500 to 800° F. Conditions may often include ratios of hydrogen to hydrocarbon of about 1800 to 20,000 s.c.f./b. and weight hourly space velocities (WHSV) of about 0.25 to 10. The hydrorefining may be conducted either as an upflow or as a downflow operation.

In a particular application of the activation procedure of this invention, a standard 1″ reactor tube was charged with 200 grams of 1/16″ extruded commercially available cobalt molybdate on alumina hydrogenation catalyst containing about 3 weight percent CoO and 10% $MoO_3$. The tube was placed in an electrically heated furnace, and filled with fluid cracker heavy cycle oil (physical inspections are given in Table I). The tube and contents were heated to 300° F. and hydrogen sulfide at atmospheric pressure was bubbled (upflow) through the catalyst and oil at a moderate rate for 6 hours. At the end of the period, the addition of hydrogen sulfide was stopped, the oil drained and hydrogen flow (downflow) at 1500 p.s.i.g. pressure was established. Cycle oil (Table I) was pumped into the tube (downflow) and the conditions of run R18–292 (Table II) established. Quality measures on the liquid product from the operation are listed in Table II.

Other tests, in which a more conventional activation procedure was employed, are also listed in Table II (Tests 18–283, 18–289 and 19–305). The procedure used was:

(1) The reactor tube (Standard 1″) was charged with 200 grams of the commercially available extruded cobalt molybdate on alumina catalyst.

(2) The tube was placed in an electrically heated furnace, and hydrogen sulfide flow at 1 atmospheric pressure established at a rate of 2 standard cubic feet per hour.

(3) The reactor temperature was raised to 650° F. without exceeding 700° F., and pressure raised to 200 p.s.i.g.

(4) The reactor was blocked in at 200 p.s.i.g. pressure with hydrogen sulfide for one hour.

(5) Hydrogen flow was established (downflow); pressure was raised to 1500 p.s.i.g.; the flow of fluid cracker heavy cycle oil was established for the test.

The superiority of the new activation procedure is clearly demonstrated by the product properties. The new procedure provides a product having a lower refractive index, higher hydrogen content and lower specific dispersion—all indications of superior results from the treating operation.

Table I.—Feedstock properties

Stock.—Fluid cracker heavy cycle oil: gravity,
° API _____ 24.4
ASTM distillation, vol. percent:
    IBP _____ —
    5 _____ 592
    10 _____ 625
    30 _____ 666
    50 _____ 687
    70 _____ 710
    90 _____ 750
Wt. percent:
    Hydrogen _____ 11.66
    Sulfur _____ 0.707
    Nitrogen _____ 0.0605
Refractive index, $n_D^{20}$ ° C. _____ 1.5222

TABLE II.—TEST CONDITIONS AND PRODUCT QUALITY

| | Run | | | |
|---|---|---|---|---|
| | 18–292 | 18–283 | 18–284 | 19–305 |
| Pretreat | New | Standard | Standard | Standard |
| Test conditions: | | | | |
|   WHSV | 1.00 | 1.0221 | 1.0125 | 1.0119 |
|   Average temperature, ° F | 725 | 726 | 727 | 726 |
|   Pressure, p.s.i.g | 1500 | 1500 | 1500 | 1500 |
|   Hydrogen ratio, s.c.f./B | 2500 | 2500 | 2500 | 2500 |
| Product quality: | | | | |
|   Gravity, ° API | 30.9 | 30.3 | 31.0 | 30.0 |
|   Refractive index, $n_D^{20}$ | 1.4848 | 1.4872 | 1.4885 | 1.4882 |
|   Wt. percent hydrogen | 13.02 | 12.84 | 12.86 | 12.83 |
|   Specific dispersion | 133.3 | 136.3 | | 137.3 |

Thus, the combined catalyst activation and prewetting treatment of the present invention is seen to provide a quicker, simpler and more efficient means for placing a fixed bed hydrogenation reactor at optimum conditions for the hydrorefining of mineral oil hydrocarbons. While the catalyst pretreatment of the invention will effectively activate the catalyst whether it is to be used for liquid or vapor phase reactions, it has been observed to have particular utility as a pretreatment for liquid continuous phase hydrorefining.

It is claimed:

1. In a process of hydrorefining a mineral oil hydrocarbon feed by contacting said feed with molecular hydrogen under hydrogenation conditions and in the presence of a fixed bed of hydrogenation catalyst, the improvement in activating said hydrogenation catalyst which comprises the steps of (A) charging a fixed bed reactor with solid hydrogenation catalyst,
(B) charging the reactor with normally liquid hydrocarbon,
(C) heating said hydrocarbon and catalyst to a temperature of about 250 to 500° F.,
(D) passing hydrogen sulfide gas through the reactor for about 3 to 12 hours at a pressure of about atmospheric to 500 pounds per square inch gauge while maintaining said hydrocarbon in liquid phase and maintaining said hydrocarbon and catalyst to a temperature of about 250–500° F.,
(E) discontinuing the flow of hydrogen sulfide and removing said hydrocarbon from the reactor,
(F) admitting molecular hydrogen to the reactor and
(G) charging hydrocarbon feed and molecular hydrogen to said reactor under hydrorefining conditions.

2. The process of claim 1 wherein the hydrogenation catalyst comprises a metal from Group VI–B and an iron series metal of Group VIII of the Periodic Table.

3. The process of claim 2 wherein the hydrocarbon of step (B) and the hydrocarbon feed have higher boiling point ranges than that of gasoline.

4. The process of claim 3 wherein the hydrogen sulfide gas is passed through the reactor at a pressure of about atmospheric to 100 pounds per square inch gauge.

5. The process of claim 4 wherein the hydrogen sulfide gas is passed through the reactor for about 4 to 8 hours.

6. The process of claim 5 in which the catalyst is cobalt molybdate on alumina.

7. The process of claim 6 wherein the internal reactor temperature during steps (C) and (D) is established and maintained at about 300 to 400° F.

8. The process of claim 1 wherein in step (D) the hydrogen sulfide gas is passed upflow through the reactor.

9. The process of claim 7 wherein in step (D) the hydrogen sulfide gas is passed upflow through the reactor.

References Cited

UNITED STATES PATENTS

| 2,623,007 | 12/1952 | Myers | 208—213 |
| 3,109,804 | 11/1963 | Martin | 252—411 |
| 3,287,258 | 11/1966 | Mason | 208—254 |
| 3,291,722 | 12/1966 | Taylor | 208—264 |

PAUL M. COUGHLAN, JR., *Primary Examiner.*

G. J. CRASANAKIS, *Assistant Examiner.*

U.S. Cl. X.R.

252—439; 208—216